United States Patent
Muthusamy et al.

(10) Patent No.: US 12,182,980 B2
(45) Date of Patent: Dec. 31, 2024

(54) COGNITIVE FILTERING OF CONTENT FROM SHARED SCREEN DISPLAY

(71) Applicant: KYNDRYL, INC., New York, NY (US)

(72) Inventors: Thangadurai Muthusamy, Bangalore (IN); Chourasia Abhishek Kumar, Bangalore (IN); Saravanan Devendran, Bangalore (IN); Pietro Iannucci, Rome (IT)

(73) Assignee: Kyndryl, Inc., New York, NY (US)

( * ) Notice: Subject to any disclaimer, the term of this patent is extended or adjusted under 35 U.S.C. 154(b) by 273 days.

(21) Appl. No.: 17/187,934

(22) Filed: Mar. 1, 2021

(65) Prior Publication Data

US 2022/0277435 A1 Sep. 1, 2022

(51) Int. Cl.
G06T 7/00 (2017.01)
G06F 3/14 (2006.01)
(Continued)

(52) U.S. Cl.
CPC .......... G06T 7/0002 (2013.01); G06F 3/1454 (2013.01); G06F 18/2178 (2023.01); G06F 18/24 (2023.01); G06F 18/40 (2023.01); G06N 5/04 (2013.01); G06N 20/00 (2019.01); G06T 5/20 (2013.01); G06T 5/70 (2024.01); G06T 5/77 (2024.01); G06T 2207/10016 (2013.01);
(Continued)

(58) Field of Classification Search
CPC ...... G06F 18/2178; G06F 18/24; G06F 18/40; G06F 3/1454; G06N 20/00; G06N 5/04; G06T 2207/10016; G06T 2207/20081; G06T 5/002; G06T 5/005; G06T 5/20; G06T 7/0002; G06V 30/10; G06V 30/41; G06V 30/413; G09G 2358/00
See application file for complete search history.

(56) References Cited

U.S. PATENT DOCUMENTS 7,685,238 B2 3/2010 Etelapera
9,118,603 B2 8/2015 Miller
(Continued)

FOREIGN PATENT DOCUMENTS

CN 110493615 A 11/2019
WO 2019060208 A1 3/2019

OTHER PUBLICATIONS

"Use of AI in Online Content Moderation", Cambridge Consultants, 2019 Report Produced on Behalf of Ofcom, 84 pages.
(Continued)

Primary Examiner — Ming Wu
(74) Attorney, Agent, or Firm — CANTOR COLBURN LLP; Erik Swanson

(57) ABSTRACT

Methods, computer program products, and/or systems are provided that perform the following operations: obtaining source display content; identifying one or more objectionable portions included in the source display content; modifying the one or more objectionable portions included in the source display content to filter content in the one or more objectionable portions; generating a filtered display content, wherein the filtered display content includes the one or more modified objectionable portions and one or more non-objectionable portions of the source display content; and providing the filtered display content for rendering of a shared presentation.

20 Claims, 8 Drawing Sheets

(51) Int. Cl.
*G06F 18/21* (2023.01)
*G06F 18/24* (2023.01)
*G06F 18/40* (2023.01)
*G06N 5/04* (2023.01)
*G06N 20/00* (2019.01)
*G06T 5/20* (2006.01)
*G06T 5/70* (2024.01)
*G06T 5/77* (2024.01)
*G06V 30/10* (2022.01)

(52) U.S. Cl.
CPC .... *G06T 2207/20081* (2013.01); *G06V 30/10* (2022.01)

(56) References Cited

U.S. PATENT DOCUMENTS

| | | | | |
|---|---|---|---|---|
| 2007/0276918 | A1* | 11/2007 | Alderson | G06F 16/972 709/217 |
| 2015/0205574 | A1 | 7/2015 | Vanjani | |
| 2016/0072858 | A1* | 3/2016 | Heyne | G06F 3/038 715/753 |
| 2016/0379335 | A1* | 12/2016 | Kwon | G06T 1/20 345/506 |
| 2017/0251182 | A1* | 8/2017 | Siminoff | G06T 7/292 |
| 2019/0272140 | A1 | 9/2019 | Sarfi | |
| 2019/0364126 | A1* | 11/2019 | Todd | G06F 21/6263 |

OTHER PUBLICATIONS

Authors et al.: Disclosed Anonymously, "Mask confidential content when screen sharing based on data lineage", An IP.com Prior Art Database Technical Disclosure, IP.com No. IPCOM000254840D, IP.com Electronic Publication Date: Aug. 8, 2018, 2 pages.

Authors et al.: Disclosed Anonymously, "Method for hiding sensitive information during screen sharing", An IP.com Prior Art Database Technical Disclosure, IP.com No. IPCOM000259670D, IP.com Electronic Publication Date: Sep. 5, 2019, 3 pages.

Authors et al.: Disclosed Anonymously, "Method to Hide Sensitive Documents in Screen Sharing", An IP.com Prior Art Database Technical Disclosure, IP.com No. IPCOM000253129D, IP.com Electronic Publication Date: Mar. 7, 2018, 4 pages.

* cited by examiner

COGNITIVE FILTERING OF CONTENT FROM SHARED SCREEN DISPLAY

BACKGROUND

The present invention relates generally to the field of machine learning, and more particularly to providing for identifying and filtering content from a shared screen display.

SUMMARY

According to an aspect of the present invention, there is a method, computer program product and/or system that performs the following operations (not necessarily in the following order): obtaining source display content; identifying one or more objectionable portions included in the source display content; modifying the one or more objectionable portions included in the source display content to filter content in the one or more objectionable portions; generating a filtered display content, wherein the filtered display content includes the one or more modified objectionable portions and one or more non-objectionable portions of the source display content; and providing the filtered display content for rendering of a shared presentation.

DETAILED DESCRIPTION

Figure 1:
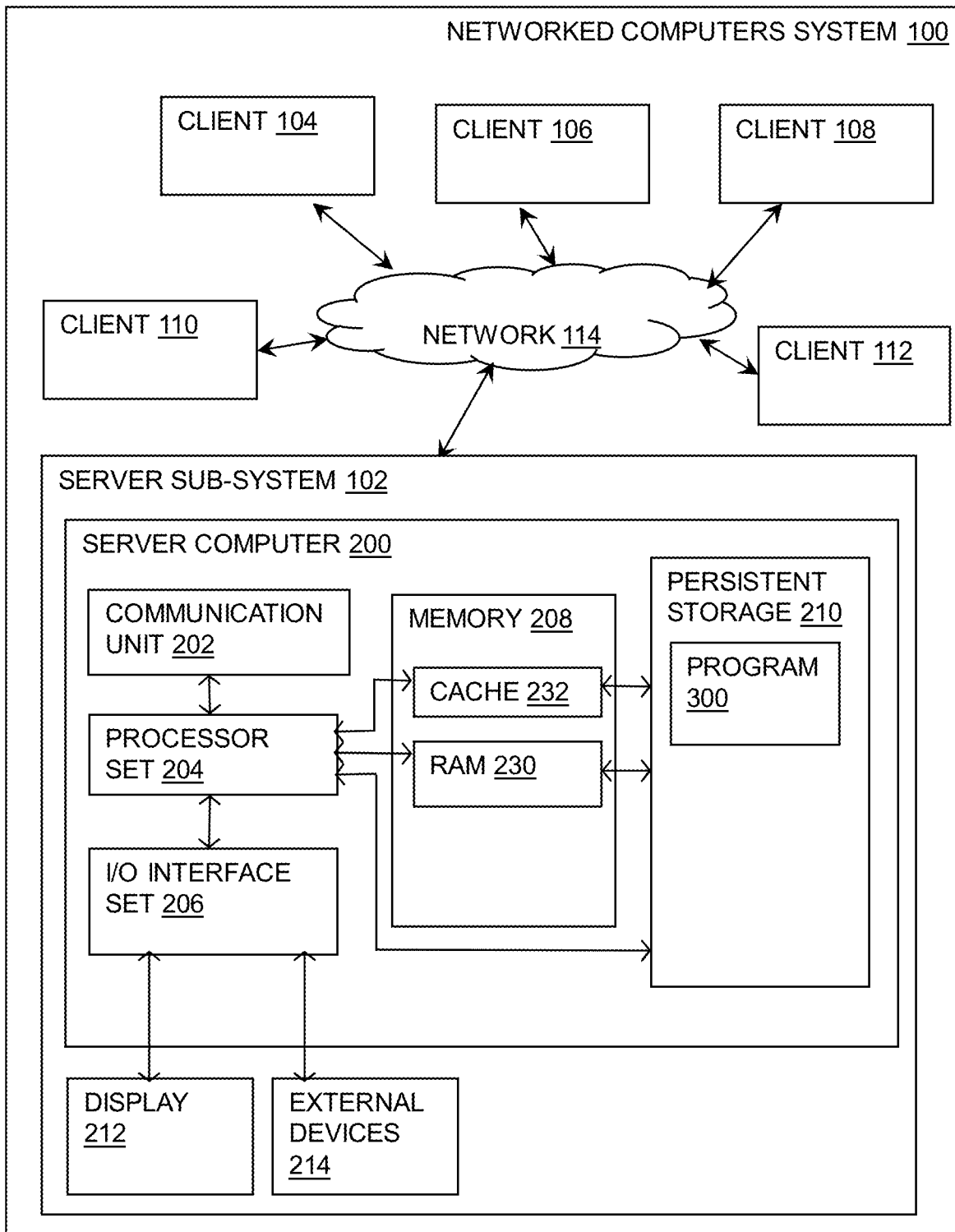
FIG. 1 is a block diagram view of a first embodiment of a system, according to the present invention.

According to aspects of the present disclosure, systems and methods can be provided to perform cognitive content filtering of screen share content. In particular, systems and methods of the present disclosure can provide for detecting and classifying content included in screen share content (e.g., shared content stream, etc.) and based in part on the classifications, provide for filtering the content that is to be shared, for example as part of a video conference, remote presentation, screen share mode, and/or the like. The systems and methods of the present disclosure can provide for generating filtered shared screen content (e.g., filtered screen share content stream, etc.) which can include viewable screen content as well as filtered screen content that has been obscured, blurred, or otherwise modified to be non-viewable.

Often, video conference tools, screen share tools, remote presentation tools, and the like can provide screen share modes such that content being rendered on a display of a presenter/source computing device can be shared (e.g., streamed, etc.) for viewing at other/remote computing devices. In some cases, the source/presenter device may also display some content other than the desired shared content, such as content that may be personal, sensitive, distracting, and/or the like. Accordingly, systems and methods of the present disclosure can provide for cognitive content filtering of shared screen content to generate filtered shared screen content which can be shared during a video conference, remote presentation, screen share mode, and/or the like.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can intercept content stream data provided by a source/presenter in a shared screen mode; classify portions of displayed content (e.g., images, text, etc.) included in the source/presenter content stream as potential objectionable content, potential non-objectionable content, and/or the like; filter/modify identified potential objectionable portions of the source content such that identified objectionable portions/content are not viewable in a shared display; generate a sharable content stream based on the non-objectionable portions and the filtered (e.g., blurred, obscured, masked, etc.) objectionable portions; and/or the like. In some embodiments, program 300 can include one or more machine-learning models which can be trained to detect and classify portions of a source display content, filter portions of source display content that are classified as potential objectionable content, reconstruct the shared display content combining the non-objectionable (e.g., viewable) portions and the filtered objectionable (e.g., non-viewable) portions, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
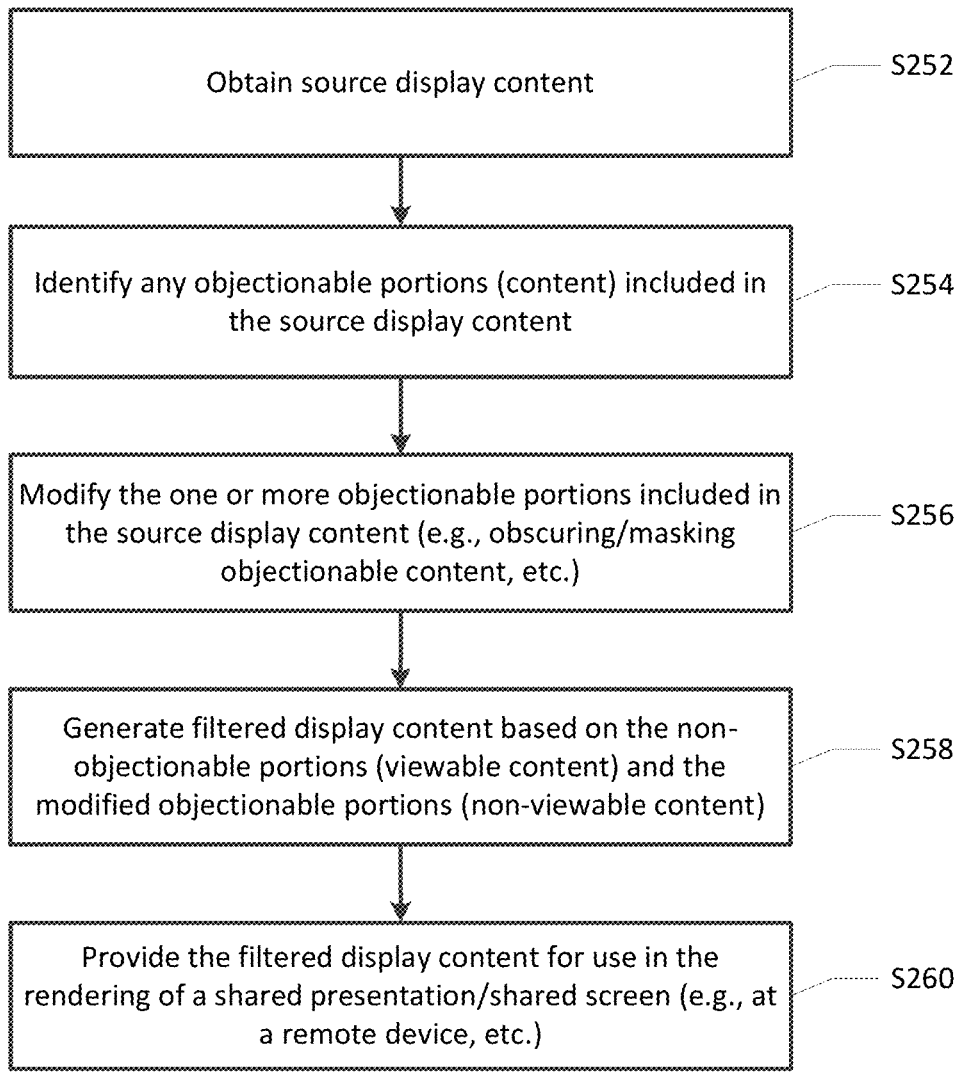
FIG. 2 is a flowchart showing a first embodiment method performed, at least in part, by the first embodiment system.
Figure 3:
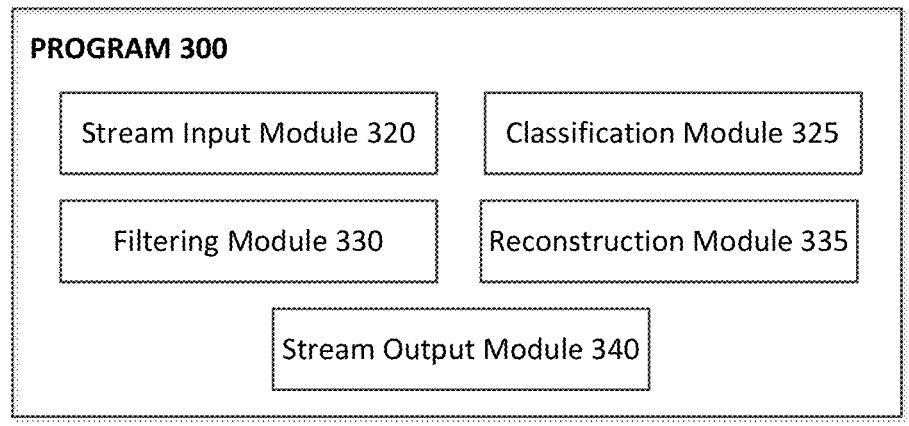
FIG. 3 is a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for filtering content from a shared screen display, presentation, etc. begin at operation S252, where a computing system (e.g., server computer 200 of FIG. 1 or the like) obtains source display content (e.g., content being displayed/provided in a shared screen mode, etc.), such as during a video conference, remote presentation, screen share, and/or the like. In some embodiments, the source display content may include images, text, application windows, notifications, and/or the like provided (e.g., rendered, drawn, displayed, presented, etc.) on a display of a user/presenter's computing system operating while in a shared screen/shared presentation mode and/or the like. As an example, a shared screen mode may provide a stream of data (e.g., screen contents, etc.) from a presenter/source computing system to one or more other computing devices (e.g., remote devices, etc.) such that the other (remote) computing device(s) can render the stream (e.g., screen contents, etc.) on display(s) associated with the other (remote) computing device(s). In some embodiments, the source display content may be provided as a screen/video data stream that includes some or all the content (e.g., images, text, etc.) provided (e.g., rendered, presented, displayed, etc.) on a user (e.g., presenter, participant, etc.) display screen. In some embodiments, the source display content may include the source screen content may include one or more of image data, video data, text data, pattern data, color data, symbol data, voice data, document files, video files, audio files, and/or the like.

As an example, a stream input module 320 of FIG. 3 and/or the like can provide for obtaining a stream of data, such as source display content, that includes content (e.g., images, text, etc.) displayed on a screen of a source/presenter device (e.g., while in a shared screen mode, etc.). For example, in some embodiments, the stream input module 320 can intercept a stream of data (e.g., source display content) generated/displayed at a source device (e.g., via video conference tools, screen sharing tools, etc.). In some embodiments, the stream input module 320 and/or the like may provide the stream of data (e.g., source display content) to one or more other modules, such as a classification module 325 and/or the like, to allow for cognitive filtering of shared screen display content.

Processing proceeds to operation S254, where the computing system (e.g., server computer 200 of FIG. 1 or the like) identifies one or more objectionable portions included in the source display content. For example, source display content may include multiple portions (e.g., application windows, screen/image regions, segments, areas, blocks, sections, etc.) which may include content such as images, text, and/or the like. The computing system may detect and categorize the multiple portions of the source display content, for example, identifying or classifying one or more potential/predicted objectionable portions (e.g., content not desirable for sharing and/or viewing remotely, etc.) of the source display content, one or more potential/predicted non-objectionable portions (e.g., content that may be shared for view during video conference/remote presentation/ screen share, etc.) of the source display content, and/or the like.

In some embodiments, the portions of the source display content identified/classified as objectionable (e.g., potential objectionable content, etc.) can include one or more of: content not desirable for shared/audience viewing (e.g., based on presentation type, purpose, setting, venue, intended audience, etc.); sensitive data (e.g., personal data, financial data, business data, confidential data, etc.); distracting content; data associated with application window(s) not in focus; background image/text data, thumbnail data, alerts/ notifications, and/or the like.

As an example, a classification module 325 of FIG. 3 and/or the like can obtain source display content (e.g., from stream input module 320, etc.), determine one or more portions (e.g., screen regions, areas, sections, windows, etc.) included in the source display content, and identify a classification (e.g., potential/predicted classification, etc.) for each portion of the source display content. For example, in some embodiments, the classification module 325 can predict/identify a classification for each portion of the source display content such that each portion of the source display content is classified as objectionable (e.g., content in identified portion may be undesirable for sharing to or viewing at a remote/receiving device, etc.) or classified as nonobjectionable (e.g., content in identified portion acceptable for sharing to or viewing at a remote/receiving device, intended/expected screen share content, etc.). In some embodiments, the classification module 325 and/or the like may include one or more machine learning models trained to detect, group, and categorize/classify content (e.g., objectionable/non-objectionable, etc.) in the source display content.

In some embodiments, the computing system may use various operations to determine/identify multiple portions (e.g., application windows, screen/image regions, segments, areas, blocks, sections, etc.) of the source display content (e.g., display screen images, etc.) which should be classified. For example, in some embodiments, image segmentation may be applied to the source display content to partition the source display content (e.g., screen image, etc.) into portions (e.g., segments, etc.) that may each be analyzed in determining or identifying a classification (e.g., objectionable/ non-objectionable, etc.) for each portion.

In some embodiments, the computing system may obtain text data and image data associated with the portions of the source display content. For example, in some embodiments, text extraction and image deconstruction can be applied to the portions of the source display content (e.g., after image segmentation, etc.). The computing system can use the obtained text data and image data associated with each portion in classifying each portion of the source display content, for example, as potential objectionable content or potential non-objectionable content.

In some embodiments, the computing system may obtain or be provided with one or more trained machine-learning models, such as an image classifier model for example, that can provide for determining or predicting a classification (e.g., objectionable content, non-objectionable content, etc.) for each portion of the source display content based on data associated with each portion (e.g., text data, image data, etc.) provided as input to the trained machine-learning model (e.g., classifier model, etc.). As an example, in some embodiments, the computing system can provide the text data and image data associated with each portion (e.g., obtained after image segmentation, text extraction, and/or image deconstruction, etc.) to an image classifier model that has been trained to classify content, for example, based, at least in part, on the image data and/or text data associated with each portion. The trained machine-learning model (e.g., classifier model, etc.) can provide output including a classification for each portion of the source display content, for example, identifying each portion as objectionable or non-objectionable. In some embodiments, the computing system can include one or more other trained machine-learning models, such as an image reconstruction model for example, that can provide for receiving output from the image classifier model and filtering potential objectionable portions of source display content (e.g., to obscure/blur potential objectionable content, etc.) based in part on the classification output from the image classifier model, as discussed in further detail below.

In some embodiments, the one or more trained machine-learning models (e.g., image classifier model, etc.) can provide for clustering and/or grouping portions of the source display content (e.g., potential objectionable content, etc.), deriving properties associated with each portion of the source display content, and relating derived properties for each portion with user preference data, historical data, other model data, and/or the like to predict objectionable content and the content position on the screen.

Processing proceeds to operation S256, where the computing system (e.g., server computer 200 of FIG. 1 or the like) modifies the one or more objectionable portions included in the source display content to filter content in the one or more objectionable portions. For example, the computing system can modify the one or more objectionable portions by filtering (e.g., masking, obscuring, blurring, etc.) the objectionable portions and/or content associated with the objectionable portions. The filtering can blur and/or obscure visibility of the objectionable portions and/or objectionable content such that the objectionable portions are not viewable/readable in a shared display content stream provided for a shared screen/presentation. In some embodiments, the computing system can provide for masking each of the one or more objectionable portions to generate one or more modified (e.g., filtered) objectionable portions. The masking of the objectionable portions can blur and/or obscure content associated with each of the one or more objectionable portions.

As an example, a filtering module 330 of FIG. 3 and/or the like can obtain the identified objectionable portions of the source display content, classification data, and/or other associated data (e.g., provided by classification module 325 and/or the like). The filtering module 330 and/or the like can filter the objectionable portions of the source display content, for example, to blur or obscure the content associated with the objectionable portions to generate modified (filtered) objectionable portions. In some embodiments, the filtering module 330 may include an objectionable image mask filter and/or the like, for example included in one or more trained machine-learning models, such as an image reconstruction model. In some embodiments, the filtering module 330 may provide the identified objectionable portions and/or associated data to the objectionable image mask filter and the objectionable image mask filter may provide for blurring and/or obscuring the objectionable portions such that associated content would not be visible, for example when source display content is shared with one or more remote devices (e.g., as part of a video conference, screen share, remote presentation, etc.).

In some embodiments, the computing system can include one or more trained machine-learning models, such as image reconstruction models. The computing system can provide the one or more objectionable portions of the source display content to the image reconstruction model as an input, for example, as part of the output generated by the image classification model. The image reconstruction model can filter the one or more objectionable portions of the source display content to filter (e.g., obscure, blur, mask, etc.) one or more objectionable portions. As an example, in some embodiments, the image reconstruction model can include an objectionable image mask filter which has been trained to filter (e.g., mask, blur, obscure, etc.) objectionable portions of source display content. The objectionable portions of the source display content (e.g., based on output from the image classification model, etc.) can be provided to the objectionable image mask filter included in the image reconstruction model. The objectionable image mask filter can generate output that includes filtered objectionable portions for each of the one or more objectionable portions provided as input to the image reconstruction model. The output of the objectionable image mask filter (e.g., modified/filtered objectionable portions that are blurred/obscured, etc.) can be used, for example by the image reconstruction model, along with one or more non-objectionable portions of the source display content (e.g., output by the image classification model, etc.) to generate a filtered display content.

Processing proceeds to operation S258, where the computing system (e.g., server computer 200 of FIG. 1 or the like) generates a filtered display content (e.g., modified screen/presentation content stream, etc.). The filtered display content includes the one or more modified objectionable portions (e.g., having content filtered/masked) and one or more non-objectionable portions (e.g., viewable content, etc.) of the source display content. For example, in some embodiments, the computing system can obtain any portions of the source display content that were identified as objectionable and subsequently filtered (e.g., content obscured/blurred, etc.). The computing system additionally obtains the portions of the source display that were identified as non-objectionable (e.g., the remaining portions of the source display content that were not identified as objectionable). The computing system generates a filtered display content (e.g., shareable screen content stream, etc.) by reconstructing content combining the modified (e.g., filtered) objectionable portions and the non-objectionable portions into a complete screen display (e.g., having one or more viewable portions and one or more obscured/blurred portions).

As an example, a reconstruction module 335 of FIG. 3 and/or the like can obtain the modified (e.g., filtered) objectionable portions, for example provided by the filter module 330 and/or the like, and additionally obtain the non-objectionable portions of the source display content, for example, provided by the classification module 325 and/or the like. The reconstruction module 335 and/or the like can combine the modified/filtered objectionable portions of the source display content and the non-objectionable portions of the source display content to generate a filtered display content, for example, providing complete shared screen display content that includes one or more visible portions and one or more blurred/obscured portions and which may be provided as part of a screen share mode (e.g., to remote device(s) as part of a video conference, remote presentation, screen share, etc.). In some embodiments, the reconstruction module 335 may include an image reconstructor and/or the like, for example, included in one or more trained machine-learning models, such as an image reconstruction model.

In some embodiments, the computing system can include one or more trained machine-learning models, such as image reconstruction models. In addition to being trained to filter objectionable portions as discussed above, one or more trained machine-learning models, for example, image reconstruction model(s), can be trained to generate a filtered display content (e.g., complete screen display to be shared, etc.) that combines one or more filtered (e.g., modified) objectionable portions with one or more non-objectionable portions of the source display content. For example, in some embodiments, the computing system can provide the one or more non-objectionable portions of the source display content to an image reconstruction model, for example as part of the output from an image classifier model. In some embodiments, the computing system can provide the one or more identified objectionable portions of the source display content to the image reconstruction model as one input (e.g., from an image classifier model, etc.) such that the objectionable portions can be filtered and provide the one or more non-objectionable portions of the source display content (e.g., remaining portions, etc.) to the image reconstruction model as another input (e.g., from the image classifier model, etc.), to be combined with filtered objectionable portions for generating a filtered display content (e.g., screen share content stream, etc.).

Processing proceeds to operation S260, where the computing system (e.g., server computer 200 of FIG. 1 or the like) provides the filtered display content for use in rendering of a shared presentation, shared screen, and/or the like. For example, the generated filtered display content (e.g., which includes viewable and non-viewable/obscured portions of screen content) can be provided to share content with other/remote computing device(s), for example, as part of a shared screen mode of a video conference, remote presentation, screen share, and/or the like.

As an example, a stream output module 340 of FIG. 3 and/or the like can obtain filtered display content (e.g., shared screen content stream, etc.) from the reconstruction module 335 and/or the like and provide the filtered display content, for example, to be shared with other/remote device(s) as part of a screen share mode in a video conference, remote presentation, screen share session, and/or the like.

Further Comments and/or Embodiments

In some embodiments, feedback data may be obtained in association with filtered display content (e.g., shared content stream, etc.) generated and/or provided during a screen share mode of a source/presenter computing device. In some embodiments, feedback data may be obtained and used in updating and/or improving content classification/filtering predictions, updating and/or improving content masking and image reconstruction, training/updating one or more machine-learning models (e.g., clustering model(s), classifier model(s), reconstruction model(s), etc.), and/or the like. For example, in some embodiments, data associated with preferences related to a screen share mode and/or the like may be obtained as feedback data to be used in updating/improving the cognitive content filtering. As another example, in some embodiments, interactions associated with screen/display content while in shared screen mode and/or the like may be obtained as feedback data to be used in updating/improving the cognitive content filtering. In another example, data associated with filtered display content generation, for example, indications of misclassified content portions, and/or the like may be obtained as feedback data to be used in updating/improving the cognitive content filtering. In some embodiments, feedback mechanism(s) may provide for a feedback loop to allow for continuous training of the machine-learning model(s).

In some embodiments, preview filtered display content may be generated, for example, based on the filtered display content. In some embodiments, for example, the preview filtered display content may be generated prior to providing the filtered display content for screen sharing to remote device(s). The preview filtered display content may be provided for rendering/display at a source/presenter computing device, for example. In some embodiments, the preview filtered display content can identify the portions of display content that have been modified/filtered (e.g., the portions that have been blurred, obscured, etc.). The preview filtered display content can provide for obtaining indications/selections of any portion(s) of the preview filtered display content that may be misclassified, for example, portions that are viewable that should be classified as objectionable portions and filtered (e.g., obscured/blurred), portions that were filtered that should be classified as non-objectionable and viewable, and/or the like. The indications of misclassified portions can be used to provide data associated with the misclassified portions for use in updating and/or training the image classification model. In some embodiments, data associated with misclassified portions may be provided to modify the misclassified portions, for example, by filtering (e.g., obscuring, blurring, etc.) any objectionable portions that were misclassified as non-objectionable, by restoring any non-objectionable portions that were misclassified as objectionable, and/or the like.

Figure 4:
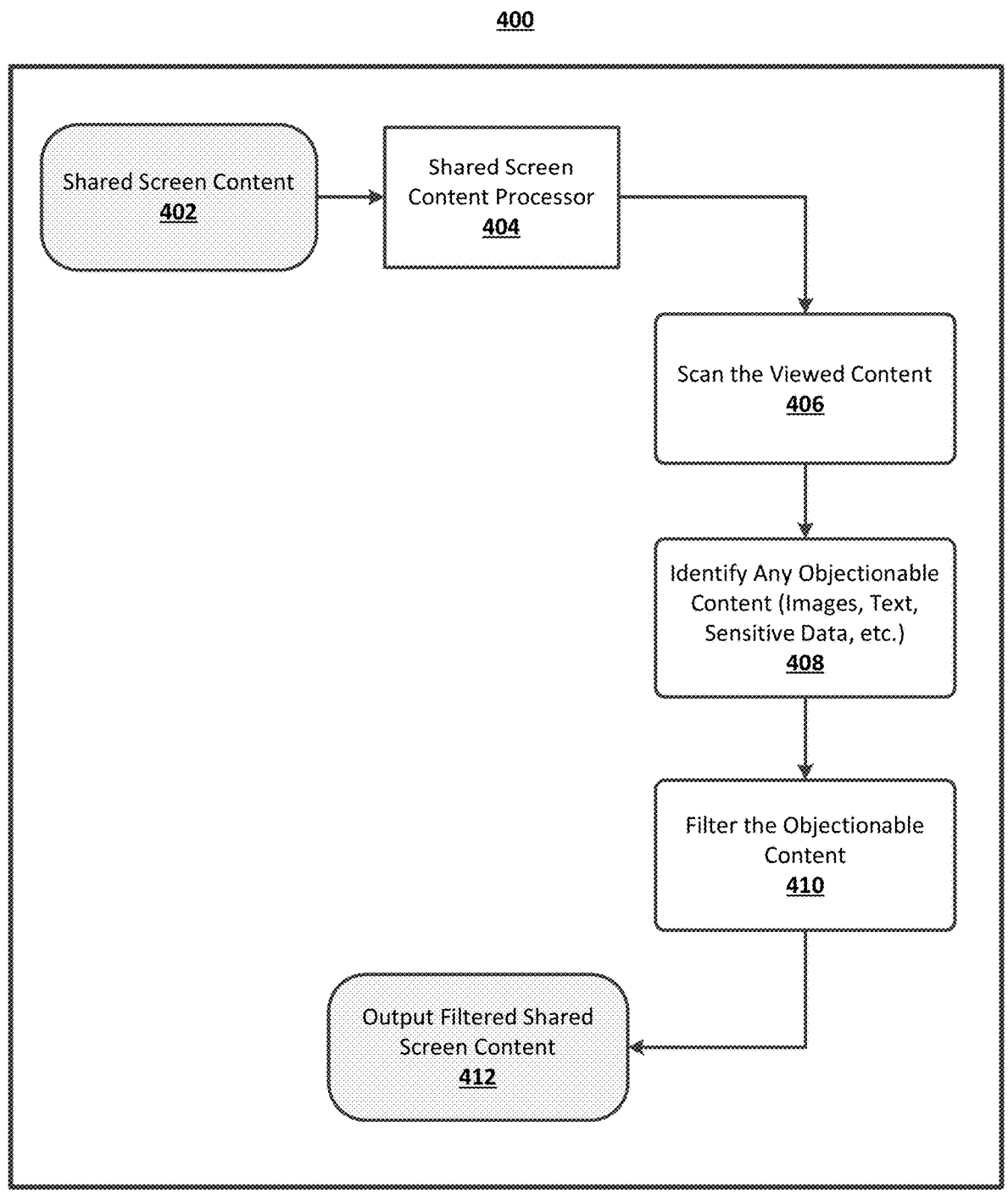
FIG. 4 is a flow diagram illustrating an example workflow architecture for objectionable content filtering, according to embodiments of the present invention.

FIG. 4 provides a flow diagram illustrating an example overview workflow architecture 400 for cognitive content filtering, according to embodiments of the present invention. Often video conference tools, screen share tools, remote presentation tools, and the like can provide screen share modes such that content being rendered on a display/screen of a presenter/source computing device can be shared (e.g., streamed, etc.) for viewing at other/remote computing devices. In some cases, the source/presenter device display screen may show also some content other than the desired shared content (e.g., content/application window that is in focus, etc.), such as content that may be considered personal, sensitive, distracting, unsuitable for the audience, and/or the like. As illustrated in FIG. 4, in some embodiments, source/presenter computing device(s) can allow content being rendered/displayed at the source/presenter computing device(s), such as shared screen content 402 (e.g., content stream(s), etc.), to be shared such that it can be viewed at other/remote computing device(s), for example, as part of a video conference, remote presentation, screen share, and/or the like.

In some embodiments, a computing device can provide for intercepting or otherwise obtaining screen/display content to be shared, such as shared screen content 402, being rendered/displayed by a presenter/source system (e.g., such computing device may be included in or otherwise associated with the presenter/source system, etc.). For example, a shared screen contents processor 404 can intercept shared screen content 402 (e.g., content stream(s), etc.) being rendered/displayed in a shared screen mode, for example, during a video conference, remote presentation, screen share, and/or the like. In some embodiments, shared screen contents processor 404 provide for cognitive filtering of content of shared screen content 402, for example, before screen content (e.g., screen share stream, etc.) is shared with and/or provided to other/remote device(s). The shared screen contents processor 404 can provide the intercepted shared screen content 402 for content scanning, for example at scan viewed content block 406, to identify and classify one or more portions of the shared screen content 402.

The portions of the scanned content (e.g., from scan viewed content block 406) can be processed to identify any portions of the content (e.g., shared screen content 402) classified as objectionable content, for example at identify objectionable content block 408. Any portions of the content (e.g., shared screen content 402) identified as objectionable content can be filtered such that the objectionable content is obscured, blurred, masked, and/or otherwise modified to be non-viewable/non-readable when the screen content is shared/provided to other/remote device(s), for example by filter objectionable content block 410. The filtered objectionable content (e.g., obscured, blurred, etc.) and the remaining non-objectionable content (e.g., content not classified as objectionable, etc.) can be used to generate/reconstruct the output filtered shared screen content 412 (e.g., filtered screen content stream, etc.) that can shared with and/or otherwise provided to other/remote device(s), for example, in a video conference, remote presentation, screen share, and/or the like.

Figure 5:
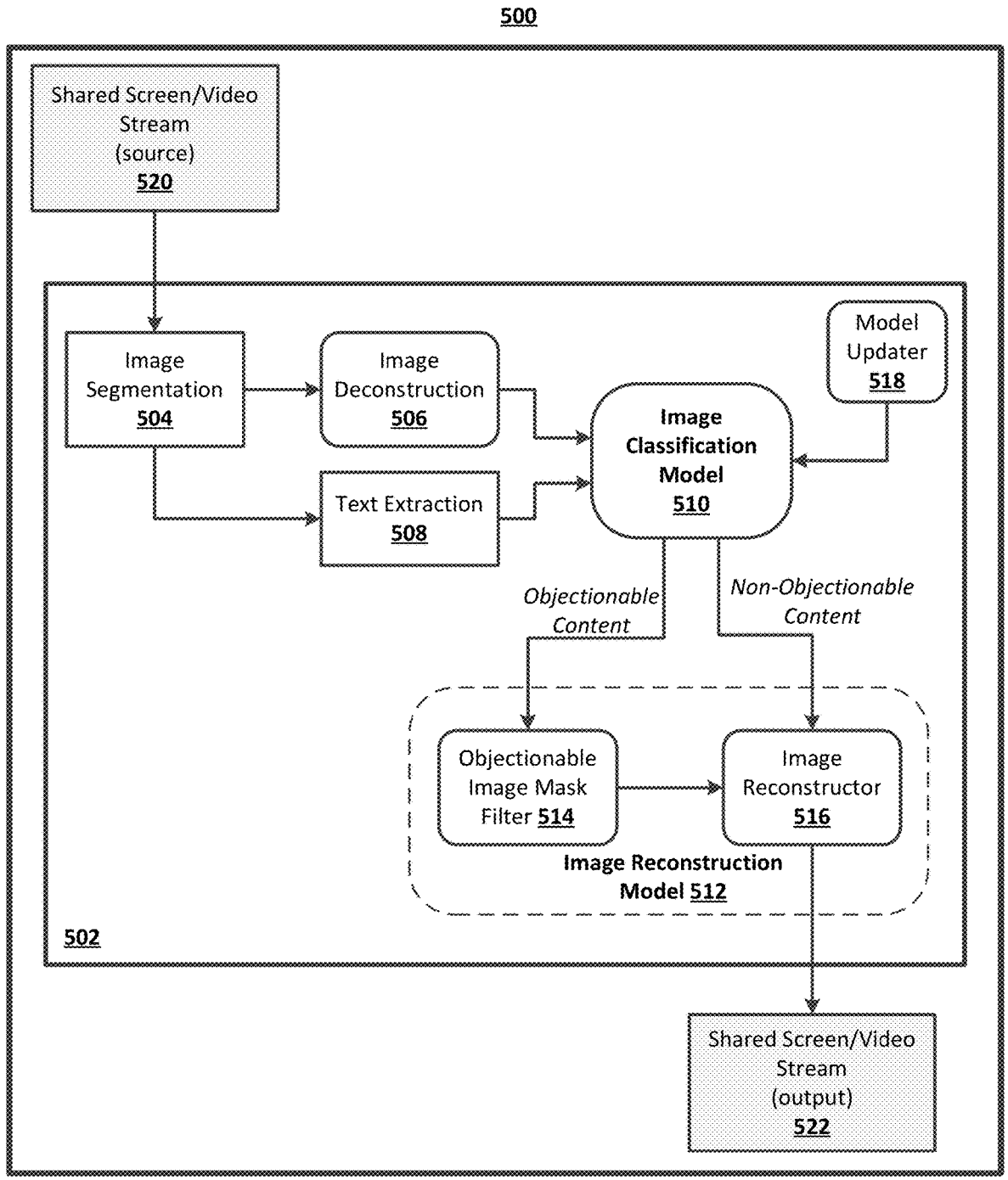
FIG. 5 is a flow diagram of cognitive objectionable content filtering of shared screen content, according to embodiments of the present invention.

FIG. 5 provides a flow diagram 500 of example cognitive content filtering of shared screen content, according to embodiments of the present invention. As illustrated in FIG. 5, in some embodiments, a source/presenter computing device can provide for content being rendered/displayed at the source/presenter computing device, such as shared screen/video stream (source) 520, to be shared such that it can be viewed at other/remote computing device(s), for example, as part of a video conference, remote presentation, screen share, and/or the like. The shared screen/video stream (source) 520 can be provided to a cognitive screen share monitor/filter 502 to provide filtering of source display/ screen content, such as shared screen/video stream (source) 520. For example, in some embodiments, cognitive screen share monitor/filter 502 can detect, classify, and filter (e.g., obscure, blur, mask, etc.) objectionable content (e.g., undesirable screen content, etc.) that may be present/included in the source shared screen content (shared screen/video stream (source) 520). The cognitive screen share monitor/filter 502 can include modules that provide for processing shared screen content/images such as image segmentation 504, image deconstruction 506, text extraction 508, and/or the like. In some embodiments, a cognitive screen share monitor/filter 502 can include machine-learning models, such as image classification model(s) 510 and image reconstruction model(s) 512, which can be trained to classify and filter content provided at a source display/screen in a shared screen mode, for example, provided in shared screen/video stream (source) 520. In some embodiments, a cognitive screen share monitor/filter 502 can include a model updater 518 that can provide for updating one or more machine-learning models, for example, based on feedback associated with content classification, content masking, and/or the like. In some embodiments, a cognitive screen share monitor/filter 502 can allow for identifying the actual contents in a screen/display across all visible regions and provide for filtering any objectionable content (e.g., undesirable screen content, etc.) in a shared screen/video stream (source) 520.

As illustrated in FIG. 5, shared screen/video stream (source) 520 can be intercepted and/or otherwise obtained by cognitive screen share monitor/filter 502. The shared screen/video stream (source) 520 can be provided to image segmentation 504. Image segmentation 504 can provide for partitioning a screen/display (e.g., in shared screen/video stream (source) 520) into screen/display portions (e.g., segments, windows, blocks, areas, etc.) that may each be analyzed by cognitive screen share monitor/filter 502. Image segmentation 504 can provide the output screen/display portions to image deconstruction 506 and text extraction 508 to obtain image data and text data associated with each screen/display portion.

Image deconstruction 506 and text extraction 508 can provide the output image data and text data associated with each portion to an image classification model 510 (e.g., machine-learning model). The image classification model 510 can be trained to detect and classify content based on image data and/or text data provided as input to the model. For example, in some embodiments, the image classification model 510 can determine or predict classifications for shared screen content filtering, such as classifying content of each screen/display portion as objectionable content (e.g., content that should be non-viewable in a shared content stream, etc.), non-objectionable content (e.g., screen content that be viewable in a shared content stream, remaining content, etc.), and/or the like.

In some embodiments, the image classification model 510 can provide grouping or clustering of screen/display content for determinations/predictions of objectionable/non-objectionable classifications, and/or the like. In some embodiments, image classification model 510 and/or the like can perform a first pass over the provided input to group/cluster identified objectionable contents, derive properties of the identified content, relate the properties with user preferences and/or historical information to predict the right contents and the position in the screen. In such embodiments, the image classification model 510 and/or the like can perform a second pass which can identify if the objects identified/ recognized in the first pass are correctly classified as objectionable content, for example, identifying which of the rectangles identified by the clustering are actually non-shareable content. In some embodiments, a cognitive screen share monitor/filter 502 (e.g., image classification model 510, etc.) can detect and categorize potentially objectionable images based solely on the image content.

Image classification model 510 can provide the identified content (e.g., objectionable content portions, non-objectionable content portions) to an image reconstruction model 512. The image reconstruction model 512 (e.g., machine-learning model) can be trained to filter identified objectionable content portions (in the source screen/display content) and reconstruct/generate a filtered screen content stream using the filtered objectionable content portions and the non-objectionable content portions.

In some embodiments, the image reconstruction model 512 can include an objectionable image mask filter 514 and an image reconstructor 516. For example, in some embodiments, the identified objectionable content portions can be provided from the image classification model 510 to objectionable image mask filter 514. The objectionable image mask filter 514 (e.g., image reconstruction model 512) can modify the objectionable content portion(s), for example, by filtering (e.g., masking, obscuring, blurring, etc.) the objectionable content portion(s). The filtering can obscure, blur, mask and/or otherwise modify the objectionable content portions such that the objectionable content portions would not viewable/readable in shared screen/display content. The modified/filtered objectionable content portion(s) can be provided from the objectionable image mask filter 514 to an image reconstructor 516, for example provided in or as part of the image reconstruction model 512.

In some embodiments, an image reconstructor 516 (e.g., image reconstruction model 512) can obtain the modified/ filtered objectionable content portion(s) from the objectionable image mask filter 514. The image reconstructor 516 (e.g., image reconstruction model 512) can also obtain the non-objectionable content portions from the image classification model 510. The image reconstructor 516 can generate (e.g., reconstruct, etc.) filtered screen/display content based on the modified/filtered objectionable content portion(s) (e.g., provided by objectionable image mask filter 514) and the non-objectionable content portions (e.g., provided by image classification model 510). The cognitive screen share monitor/filter 502 (e.g., image reconstruction model 512, image reconstructor 516, etc.) can provide the filtered screen/display content as an output screen/display content stream, such as shared screen/video stream (output) 522, for example. The shared screen/video stream (output) 522 can be provided to other/remote device(s), for example, in a video conference, remote presentation, screen share mode, and/or the like.

In some embodiments, a cognitive screen share monitor/ filter 502 can provide for updating one or more machine-learning models included in and/or associated with the cognitive screen share monitor/filter 502, such as model updater 518. As an example, in some embodiments, the cognitive screen share monitor/filter 502, model updater 518, and/or the like can provide for obtaining and/or generating feedback (e.g., user preferences, user feedback, indication of misclassified content, etc.) associated with classification of content portions, masking of content portions, and/or the like. The feedback can be used, for example by the model updater 518, in retraining/updating the model(s) associated with the cognitive screen share monitor/ filter 502.

Figure 6:
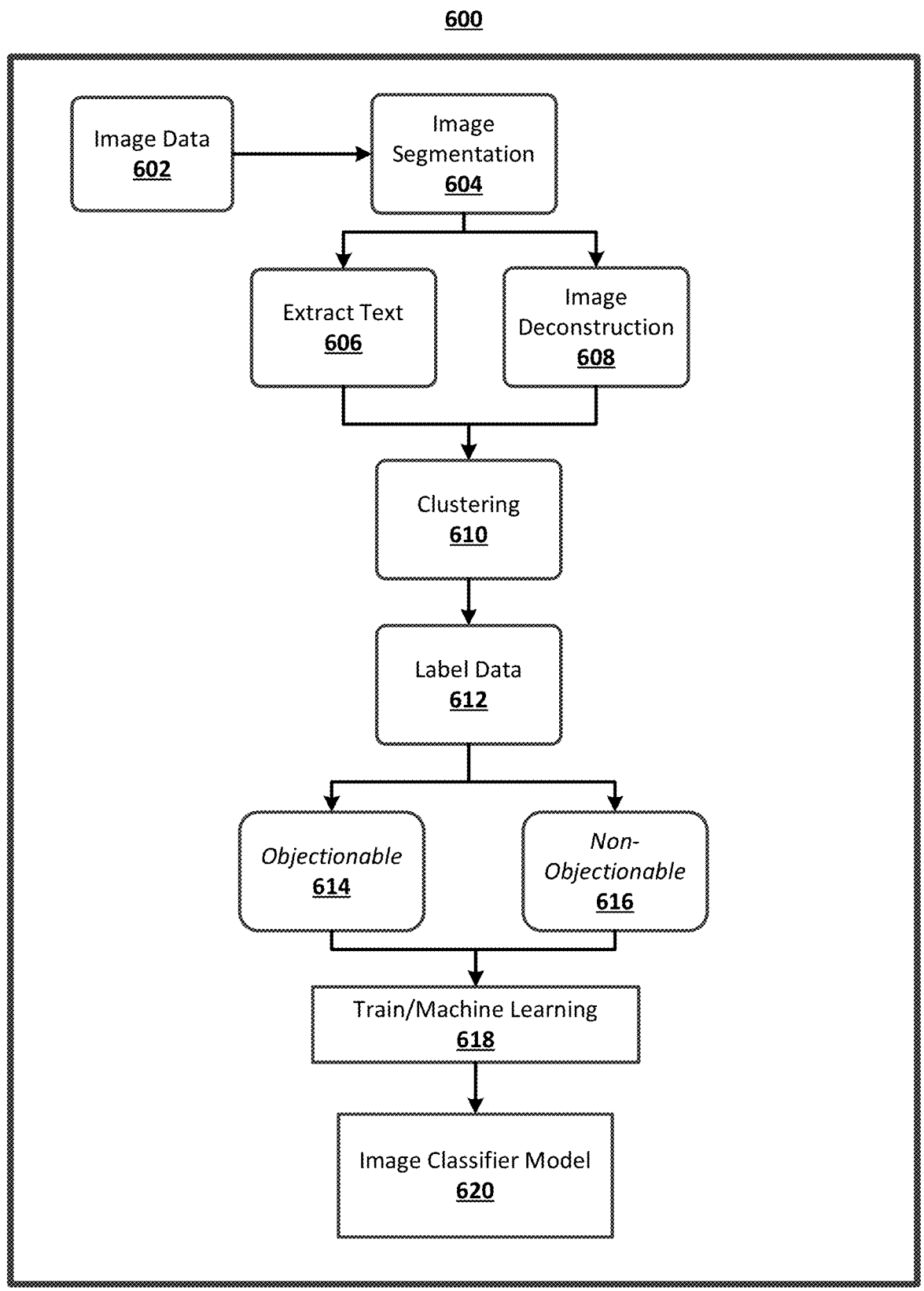
FIG. 6 is a flow diagram of example training for objectionable content identification, according to embodiments of the present invention.

FIG. 6 is a flow diagram 600 of example training for content classification model(s) for use in cognitive shared screen content filtering, according to embodiments of the present invention. As discussed herein, an image classification model can be trained to detect and classify content and provided for use in cognitive screen share content filtering, for example. In some embodiments, training data, such as image data 602 and/or the like, can be provided for training of one or more machine-learning models for use in cognitive screen share content filtering. For example, the machine-learning model(s) can be trained to provide detection, clustering, classification prediction, and/or the like for shared screen content provided as input to the model(s). In some embodiments, the training of such machine-learning model(s) can be performed using supervised training, unsupervised training, or some combination of supervised and unsupervised training.

As illustrated in FIG. 6, image data 602 can be provided as training data for machine-learning classification model(s), such as image classifier model 620 and/or the like. For example, the image data 602 may provide content data that includes objectionable content, non-objectionable content, and/or the like. The image data 602 can be provided to image segmentation 604. Image segmentation 604 can provide for partitioning screen content (e.g., source screen content provided in a screen share mode, etc.) into portions (e.g., segments, windows, blocks, areas, etc.) such that detection and classification of content can be performed on each portion.

Image segmentation 604 can provide the segmentation output (e.g., display content portions, etc.) to text extraction 606 and image deconstruction 608. to obtain image data and text data associated with each screen/display portion. Text extraction 606 and image deconstruction 608 can obtain text data and/or image data associated with each content portion for use in detection, clustering, classification, and/or the like. The output text data and image data from text extraction 606 and image deconstruction 608 can be provided to clustering block 610. Clustering block 610 can perform clustering or grouping of content based, at least in part, on the text data and/or image data associated with each portion.

Clustering block 610 can provide the output clustered/grouped content portions to label data block 612, which can provide label data associated with the content portions for use in training the machine-learning model(s). The labeled content portions can be output from label data block 612 and divided into objectionable classification 614 and non-objectionable classification 616.

The content portions for each classification, into objectionable classification 614 and non-objectionable classification 616, can be provided as training input to training/machine-learning block 618 to train a machine-learning model, for example, to provide detection, classification, and/or the like of shared screen content. In some embodiments, training/machine-learning block 618 can provide for training the machine-learning model using supervised training, unsupervised training, or some combination of supervised and unsupervised training. training/machine-learning block 618 can output a trained classification model, such as image classifier model 620. A trained image classifier model 620 can be provided for use in cognitive screen share content filtering, such as discussed above in FIGS. 2, 4, and 5.

Figure 7:
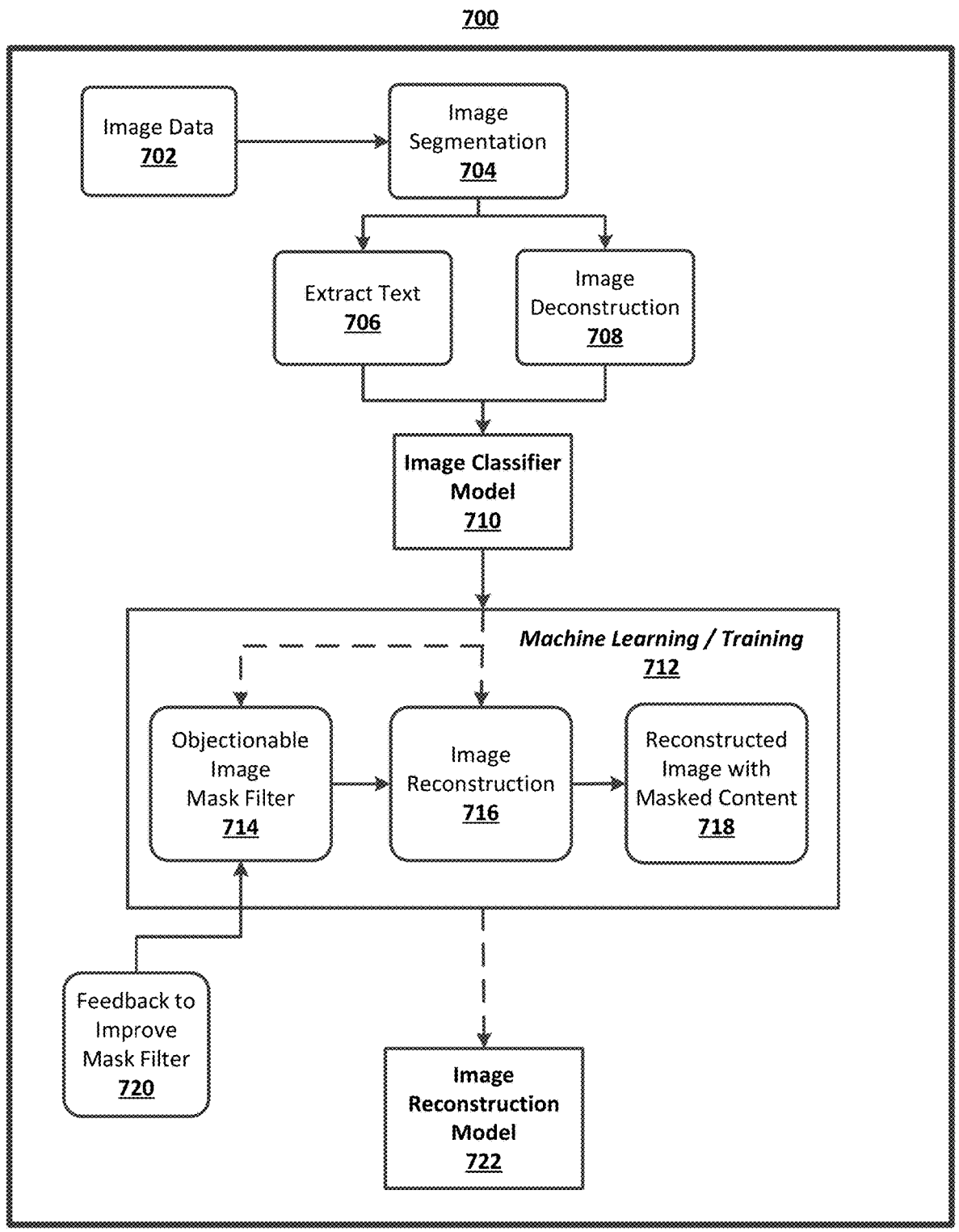
FIG. 7 is a flow diagram of example training for objectionable content masking, according to embodiments of the present invention.

FIG. 7 is a flow diagram 700 of example training for content filtering/reconstruction model(s) for use in cognitive shared screen content filtering, according to embodiments of the present invention. As discussed herein, content filtering/reconstruction model(s), such as image reconstruction model 722 and/or the like, can be trained to filter screen share content and generate/reconstruct filtered screen share content, for example, as part of cognitive screen share content filtering. In some embodiments, training data, such as image data 702 and/or the like, can be provided for training of one or more machine-learning models for use in cognitive screen share content filtering. For example, the machine-learning model(s) can be trained to provide filtering of objectionable content, generation of filtered screen share content, and/or the like. In some embodiments, the training of such machine-learning model(s) can be performed using supervised training, unsupervised training, or some combination of supervised and unsupervised training.

As illustrated in FIG. 7, in some embodiments, image data 702 can be provided as training data for machine-learning classification model(s), such as image reconstruction model 722 and/or the like. For example, the image data 702 may provide content data that includes objectionable content, non-objectionable content, and/or the like, which may be used for model training. The image data 702 can be provided to image segmentation 704 to provide for partitioning screen content (e.g., source screen content provided in a screen share mode, etc.) into portions (e.g., segments, windows, blocks, areas, etc.) such that detection and classification of content can be performed for each portion.

Image segmentation 704 can provide the segmentation output (e.g., screen/display content portions, etc.) to text extraction 706 and image deconstruction 708. to obtain image data and text data associated with each screen/display portion. The output text data and image data can be provided to image classifier model 710 (e.g., classifier model trained as discussed in FIG. 6, etc.). Image classifier model 710 can detect content and identify/predict content classifications for each portion, for example, objectionable content, non-objectionable content, and/or the like. The content portions and classification data can be provided to machine learning/training block 712 for training of machine learning model(s), such as an image reconstruction model for cognitive screen share content filtering.

For example, in some embodiments, content portions identified as objectionable (e.g., by image classifier model 710, etc.) can be provided to train an objectionable image mask filter 714 which can be trained as part of an image reconstruction model. An objectionable image mask filter 714 can be trained to filter content portions identified as objectionable, for example, to obscure, blur, mask, and/or otherwise modify the objectionable content to render it unviewable/unreadable when shared in a screen share mode. The filtered/modified objectionable content portions can be provide to image reconstruction module 716 which can also be trained as part of an image reconstruction model.

Figure 8:
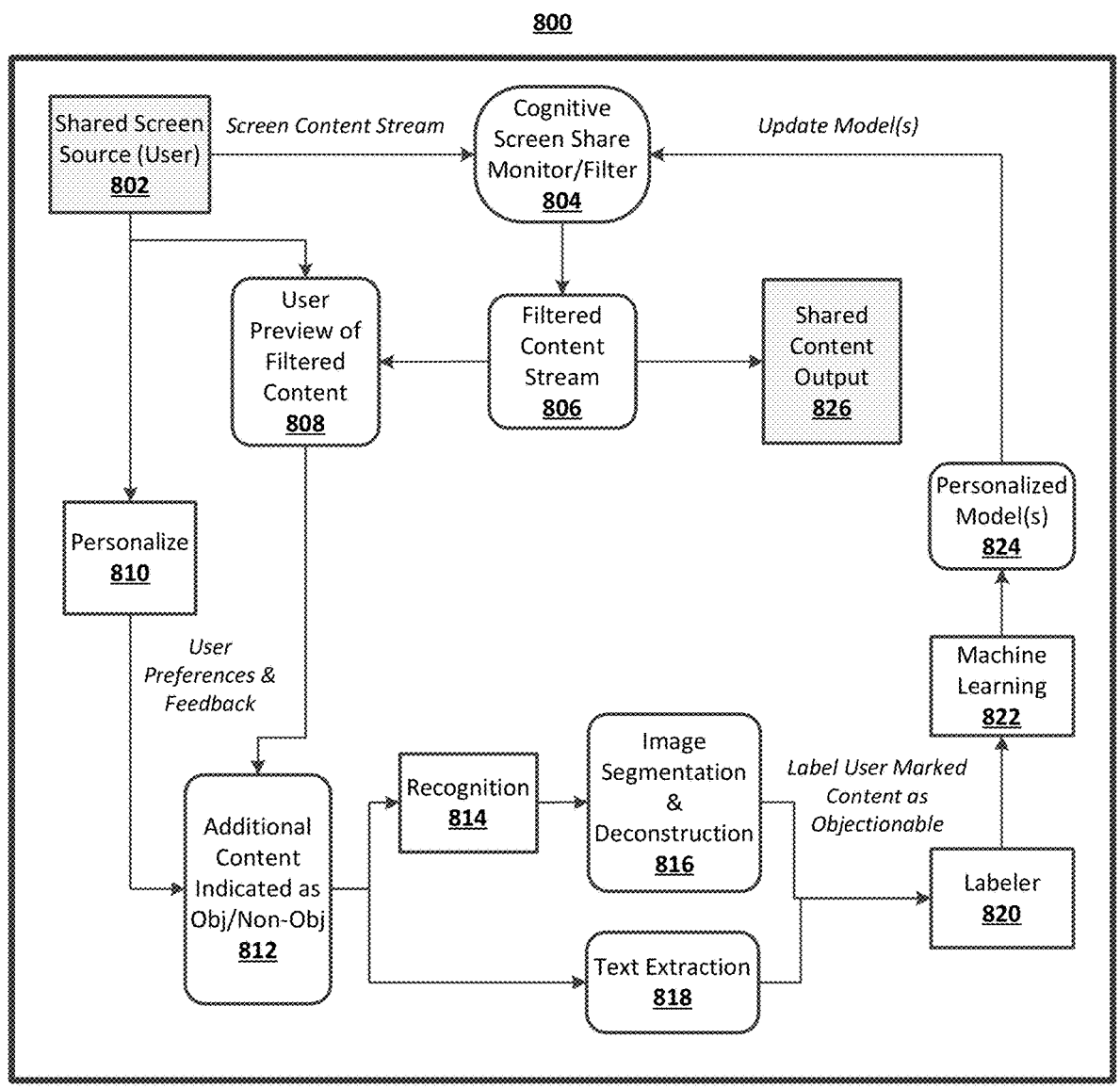
FIG. 8 is a flow diagram of example feedback/updating for a cognitive objectionable content filtering model, according to embodiments of the present invention.

The image reconstruction module 716 can also be provided with the content portions classified as non-objectionable, for example, from the image classifier model 710, in addition to the filtered/modified objectionable content portions provided from the objectionable image mask filter 714. The image reconstruction module 716 can be trained to generate/reconstruct filtered screen/display content, for example, based on a combination of the filtered/modified objectionable content portions and the non-objectionable content portions. For example, to facilitate training of the model, the image reconstruction module 716 can provide the filtered screen/display content to reconstructed image module 718 for analysis/comparison and facilitate training of the objectionable image mask filter 714 and the image reconstruction module 716 for an image reconstruction model, such as image reconstruction model 722. In some embodiments, feedback module 720 can allow for providing feedback data (e.g., regarding appropriate content filtering, etc.) that can be used in machine learning/training to update/train an image reconstruction model, for example, allow for improvements to an objectionable image mask filter. The machine learning/training 712 can provide a trained machine-learning model as output, for example image reconstruction model 722, that can be provided to facilitate cognitive screen share content filtering, FIG. 8 is a flow diagram 800 of example feedback/ updating loop for cognitive content filtering models, according to embodiments of the present invention. As illustrated in FIG. 8, in some embodiments, a source/presenter computing device can provide for content being rendered/displayed at the source/presenter computing device, such as shared screen source 802, to be shared such that it can be viewed at other/remote computing device(s), for example, as part of a video conference, remote presentation, screen share, and/or the like. A shared screen source 802 screen content stream can be provided to a cognitive screen share monitor/filter 804 which can provide filtering of source screen content, such as may be provided by shared screen source 802. For example, in some embodiments, cognitive screen share monitor/filter 804 can detect, classify, and filter (e.g., obscure, blur, mask, etc.) objectionable content that may be present/included in the source shared screen content (e.g., screen content stream, etc.). In some embodiments, a cognitive screen share monitor/filter 804 can include machine-learning models, such as image classification model(s) and image reconstruction model(s), which can be trained to classify and filter content provided in a shared screen mode, for example, provided by shared screen source 802. The cognitive screen share monitor/filter 804 can generate filtered display/screen content, for example, filtered content stream 806, which includes the original viewable non-objectionable content of the source screen content stream and the filtered/modified objectionable content of the source content screen (e.g., obscured, blurred, masked, etc.). The filtered content stream 806 can be provided, for example as shared content output 826, for screen content sharing to other/remote device(s) such as during a video conference, remote presentation, screen share mode, and/or the like.

As illustrated in FIG. 8, in some embodiments, a feedback loop and/or model update loop may be included to provide for the collection of feedback data which can be provided to update one or more machine-learning models included in the cognitive screen share monitor/filter 804 (e.g., classification model(s), reconstruction model(s), etc.). For example, feedback data associated with filtered/modified screen/display content generated and provided by the cognitive screen share monitor/filter 804, such as filtered content stream 806, can be obtained and provided to allow for continuously training one or more of the machine-learning models. The updated model(s) can be provided to the cognitive screen share monitor/filter 804, for example, to allow for improvement and/or personalization of model(s) included in a cognitive screen share monitor/filter 804. As an example, feedback data can be used in retraining a classification model and provide updates/improvements to content classification predictions and/or provide for personalization of content classification. In some embodiments, the feedback loop and/or model update loop may allow for continuous training of the machine learning model(s).

In some embodiments, a cognitive screen share monitor/filter 804 and/or the like can provide a preview filtered content 808 based on the filtered content stream 806. The preview filtered content 808 can provide for review of the filtered screen content and allow feedback data to be obtained. As an example, preview filtered content 808 may provide indications of what portions of screen content has been classified as objectionable and subsequently filtered (e.g., obscured, blurred, masked, etc.), indications of remaining non-objectionable portions of screen content, and/or the like. The preview filtered content 808 can facilitate obtaining feedback associated with one or more filtered/modified objectionable content portions and/or one or more non-objectionable content portions.

In some embodiments, one or more content portions included in the preview filtered content 808 may be indicated as additional objectionable content or an additional non-objectionable content, such as additional indicated content 812. For example, obtained feedback data (e.g., additional indicated content 812, etc.) may include one or more indications/selections of content misclassified as non-objectionable (e.g., viewable, etc.) that should be identified as objectionable content to be filtered/modified. Obtained feedback data (e.g., additional indicated content 812, etc.) may also include one or more indications/selections of content misclassified as objectionable (e.g., filtered/modified, etc.) that should be identified as non-objectionable content and, for example, provided as displayed in the original source screen content.

In some embodiments, personalization data 810 may be provided as feedback data. For example, personalization data may include user preference data, historical shared screen content interaction data, and/or the like. In some embodiments, the personalization data 810 may be used as feedback to update on or more machine learning model(s) included in a cognitive screen share monitor/filter 804 to allow the cognitive screen share monitor/filter 804 (e.g., model(s), etc.) to operate in a more personalized manner.

The feedback data, for example, personalization data 810 and/or additional indicated content 812, can be provided to a recognition module 814. The recognition module 814 can provide for recognizing the classification done on the images based on the user feedback and allows for retraining to understand whether the segments are objectionable or non-objectionable. The recognition module 814 output can be provided to image segmentation and deconstruction module 816 which can segment screen content into portions and obtain image data for each content portion. The feedback data, for example, personalization data 810 and/or additional indicated content 812, can be provided to a text extraction module 818 to obtain text data, for example associated with screen content, in the feedback. The obtained image data and/or text data can be provided to the labeler 820 which can label any additional indicated content with an appropriate classification (e.g., objectionable, non-objectionable, etc.). the labeled data can be provided (e.g., as training data) to the machine learning module 822 and used for additional training of the machine-learning model(s). The machine learning module 822 can output the updated trained machine-learning model(s), for example, as updated/personalized model(s) 824. The updated/personalized model(s) 824 can be provided to the cognitive screen share monitor/filter 804 to update the included machine-learning model(s).

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    obtaining source display content, the source display content including shared screen content rendered by and being displayed on a screen of a source device and being output by the source device for concurrent display thereof by a remote device located remotely from the source device;
    identifying one or more objectionable portions included in the source display content;
    modifying the one or more objectionable portions included in the source display content to filter content in the one or more objectionable portions;
    generating a filtered display content, wherein the filtered display content includes the one or more modified objectionable portions and one or more non-objectionable portions of the source display content; and
    providing the filtered display content for rendering of filtered shared screen content by the remote device while the shared screen content is being displayed on the screen of the source device in original form.

2. The computer-implemented method of claim 1, wherein identifying the one or more objectionable portions included in the source display content comprises:
    obtaining text data and image data in the source display content; and
    classifying some portions of the source display content as potential objectionable content and classifying other portions of the source display content as potential non-objectionable content based, at least in part, on the text data and image data.

3. The computer-implemented method of claim 2, further comprising:
    providing the text data and the image data to an image classifier model, wherein the image classifier model is trained to classify the source display content as objectionable content, as non-objectional content, or some of the content as objectionable content and some of the content as non-objectionable content;
    identifying portions of the source display content as objectionable; and
    providing the identified portions of the source display content to an image reconstruction model, wherein the image reconstruction model is trained to filter the one or more objectionable portions to obscure content and generate the filtered display content.

4. The computer-implemented method of claim 3, further comprising:
    providing one or more of the objectionable portions to the image reconstruction model;
    filtering the one or more objectionable portions to generate one or more modified objectionable portions including obscured content;
    providing the one or more non-objectionable portions to the image reconstruction model; and
    generating the filtered display content based on the one or more non-objectionable portions and the one or more modified objectionable portions.

5. The computer-implemented method of claim 4, further comprising:
    providing preview filtered display content based on the filtered display content;
    obtaining indications that one or more portions of the preview filtered display content were misclassified; and
    providing data associated with the one or more misclassified portions for use in updating the image classifier model.

6. The computer-implemented method of claim 1, wherein modifying the one or more objectionable portions included in the source display content comprises:
    masking the one or more objectionable portions to generate the one or more modified objectionable portions, wherein the masking obscures content in the one or more objectionable portions.

7. The computer-implemented method of claim 1, further comprising:
    obtaining feedback data associated with the filtered display content, the feedback data including one or more indications of objectionable content misclassified as non-objectionable; and
    updating an image classifier model and an image reconstruction model based, at least in part, on the feedback data.

8. The computer-implemented method of claim 7, wherein the feedback data includes user preference data.

9. The computer-implemented method of claim 7, wherein the feedback data includes historical shared screen content interaction data associated with the filtered display content.

10. The computer-implemented method of claim 1, wherein the shared screen content rendered by and displayed on the screen of the source device includes a presentation controlled by a user at the source device during a video conference.

11. A computer program product comprising a computer readable storage medium having stored thereon:
program instructions programmed to obtain source display content, the source display content including shared screen content being displayed on a screen of a source device and being output for concurrent display thereof by a remote device located remotely from the source device;
program instructions programmed to identify one or more objectionable portions included in the source display content;
program instructions programmed to modify the one or more objectionable portions included in the source display content to filter content in the one or more objectionable portions;
program instructions programmed to generate a filtered display content, wherein the filtered display content includes the one or more modified objectionable portions and one or more non-objectionable portions of the source display content;
program instructions programmed to provide the filtered display content for rendering of filtered shared screen display content by the remote device while the shared screen content is being displayed on the screen of the source device in original form;
program instructions programmed to obtain feedback data associated with the filtered display content, the feedback data including one or more indications of non-objectionable content misclassified as objectionable; and
program instructions programmed to update an image classifier model and an image reconstruction model based, at least in part, on the feedback data.

12. The computer program product of claim 11, wherein identifying the one or more objectionable portions included in the source display content comprises:
obtaining text data and image data in the source display content; and
classifying some portions of the source display content as potential objectionable content and classifying other portions of the source display content as potential non-objectionable content based, at least in part, on the text data and image data.

13. The computer program product of claim 12, the computer readable storage medium having further stored thereon:
program instructions programmed to provide the text data and the image data to the image classifier model, wherein the image classifier model is trained to classify the source display content as objectionable content, as non-objectional content, or some of the content as objectionable content and some of the content as non-objectionable content;
program instructions programmed to identify portions of the source display content as objectionable; and
program instructions programmed to provide the identified portions of the source display content to the image reconstruction model, wherein the image reconstruction model is trained to filter the one or more objectionable portions to obscure content and generate the filtered display content.

14. The computer program product of claim 13, the computer readable storage medium having further stored thereon:
program instructions programmed to provide one or more of the objectionable portions to the image reconstruction model;
program instructions programmed to filter the one or more objectionable portions to generate one or more modified objectionable portions including obscured content;
program instructions programmed to provide the one or more non-objectionable portions to the image reconstruction model; and
program instructions programmed to generate the filtered display content based on the one or more non-objectionable portions and the one or more modified objectionable portions.

15. The computer program product of claim 11, wherein modifying the one or more objectionable portions included in the source display content comprises:
masking the one or more objectionable portions to generate the one or more modified objectionable portions, wherein the masking obscures content in the one or more objectionable portions.

16. The computer program product of claim 10, the computer readable storage medium having further stored thereon:
program instructions programmed to provide preview filtered display content based on the filtered display content;
program instructions programmed to obtain indications that one or more portions of the preview filtered display content were misclassified; and
program instructions programmed to provide data associated with the one or more misclassified portions for use in updating the image classifier model.

17. A computer system comprising:
a processor set; and
a computer readable storage medium;
wherein:
the processor set is structured, located, connected and programmed to run program instructions stored on the computer readable storage medium; and
the stored program instructions include:
program instructions programmed to obtain source display content, the source display content including shared screen content being displayed on a screen of a source device and being output for concurrent display thereof by a remote device located remotely from the source device;
program instructions programmed to identify one or more objectionable portions included in the source display content;
program instructions programmed to modify the one or more objectionable portions included in the source display content to filter content in the one or more objectionable portions;
program instructions programmed to generate a filtered display content, wherein the filtered display content includes the one or more modified objectionable portions and one or more non-objectionable portions of the source display content;
program instructions programmed to provide the filtered display content for rendering of filtered shared screen content by the remote device while the shared screen content is being displayed on the screen of the source device;

program instructions to obtain feedback data associated with the filtered display content, the feedback data including one or more indications of non-objectionable content misclassified as objectionable; and program instructions to update an image classifier model and an image reconstruction model based, at least in part, on the feedback data.

18. The computer system of claim 17, wherein identifying the one or more objectionable portions included in the source display content comprises:

obtaining text data and image data in the source display content; and classifying some portions of the source display content as potential objectionable content and classifying other portions of the source display content as potential non-objectionable content based, at least in part, on the text data and image data.

19. The computer system of claim 17, wherein modifying the one or more objectionable portions included in the source display content comprises:

masking the one or more objectionable portions to generate the one or more modified objectionable portions, wherein the masking obscures content in the one or more objectionable portions.

20. The computer system of claim 18, wherein the stored program instructions further include:

program instructions programmed to provide the text data and the image data to the image classifier model, wherein the image classifier model is trained to classify content as objectionable content, as non-objectional content, or some of the content as objectionable content and some of the content as non-objectionable content;

program instructions programmed to identify portions of the source display content as objectionable; and program instructions programmed to provide the identified portions of the source display content to the image reconstruction model, wherein the image reconstruction model is trained to filter the one or more objectionable portions to obscure content and generate the filtered display content.

* * * * *